(12) United States Patent
Ferren et al.

(10) Patent No.: US 8,439,265 B2
(45) Date of Patent: May 14, 2013

(54) CAMERA APPLICATIONS IN A HANDHELD DEVICE

(75) Inventors: Bran Ferren, Beverly Hills, CA (US); Keith H. Nishihara, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/376,621

(22) PCT Filed: Dec. 30, 2009

(86) PCT No.: PCT/US2009/069804
§ 371 (c)(1),
(2), (4) Date: Dec. 7, 2011

(87) PCT Pub. No.: WO2010/147609
PCT Pub. Date: Dec. 23, 2010

(65) Prior Publication Data
US 2012/0074227 A1 Mar. 29, 2012

Related U.S. Application Data (60) Provisional application No. 61/187,520, filed on Jun. 16, 2009.

(51) Int. Cl.
*G06K 7/10* (2006.01)
(52) U.S. Cl.
USPC .................................. 235/462.21; 235/462.17
(58) Field of Classification Search ............. 235/462.21, 235/462.17, 462.22, 462.23
See application file for complete search history.

(56) References Cited

U.S. PATENT DOCUMENTS

| 5,594,524 | A | 1/1997 | Sasagaki | |
|---|---|---|---|---|
| 6,657,668 | B1 | 12/2003 | Hata | |
| 7,382,546 | B2 * | 6/2008 | Konno | 359/678 |
| 2003/0117501 | A1 | 6/2003 | Shirakawa | |
| 2004/0091256 | A1 | 5/2004 | Brost | |
| 2004/0114918 | A1 | 6/2004 | Cahall | |

(Continued)

FOREIGN PATENT DOCUMENTS

| CN | 101408720 | 4/2009 |
|---|---|---|
| JP | 2008147756 | 6/2008 |
| KR | 10-0738803 | 7/2007 |

(Continued)

OTHER PUBLICATIONS

International Search Report and Written Opinion received for PCT Patent Application No. PCT/US2009/069804, mailed on May 20, 2010, 12 pages.

(Continued)

*Primary Examiner* — Daniel St. Cyr
(74) *Attorney, Agent, or Firm* — Blakely, Sokoloff, Taylor & Zafman LLP (57) ABSTRACT

A hand held device containing at least one camera can perform various functions. In some embodiments, digitized images taken with two or more camera lenses having different fixed focal lengths may be combined to emulate a high-resolution optical zoom, and may also permit the device to perform 3D applications. In other embodiments, a device containing a camera may perform as a bar code reader, and may wirelessly transmit and/or visually present a bar code to other devices. Movable optics may permit the same camera to focus on either distant objects or on a close-up bar code.

23 Claims, 9 Drawing Sheets

U.S. PATENT DOCUMENTS

| | | | |
|---|---|---|---|
| 2006/0256229 A1 | 11/2006 | Wernersson | |
| 2008/0198730 A1* | 8/2008 | Mori et al. | 369/112.23 |
| 2009/0002797 A1 | 1/2009 | Kwong et al. | |
| 2009/0005112 A1* | 1/2009 | Sorek et al. | 455/556.2 |
| 2009/0084956 A1* | 4/2009 | Gat | 250/338.1 |

FOREIGN PATENT DOCUMENTS

| | | |
|---|---|---|
| WO | WO-2008/112053 | 9/2008 |
| WO | 2010147609 A1 | 12/2010 |

OTHER PUBLICATIONS

Extended European Search Report completed Sep. 7, 2012, in European Patent Application No. 09846308.6, 8 pages.

Non Final Notice of Reasons for Rejection dated Dec. 11, 2012, in Japanese Patent Application No. 2012-511802, 4 pages.

Notice of Preliminary Rejection dated Nov. 8, 2012 (+ English translation), in Korean Patent Application No. 10-2011-7026403, 5 pages.

* cited by examiner

CAMERA APPLICATIONS IN A HANDHELD DEVICE

RELATED APPLICATIONS

This application is related to and claims priority to U.S. Provisional Patent Application No. 61/187,520, filed Jun. 16, 2009, and International Application PCT/US2009/069804, and such applications are incorporated herein by reference.

BACKGROUND

As the technology of handheld electronic devices improves, various types of functionality are being combined into a single device, and the form factor of these devices is becoming smaller. These devices may have extensive processing power, virtual keyboards, wireless connectivity for cell phone and internet service, and cameras, among other things. Cameras in particular have become popular additions, but the cameras included in these devices are typically limited to taking low resolution snapshots and short video sequences. The small size, small weight, and portability requirements of these devices prevents many of the more sophisticated uses for cameras from being included. For example, they typically use a lens with a fixed focal length and fixed field of view because a zoom lens would be too heavy and require more physical depth than the body of the device permits. For these reasons, an optical zoom lens may be impractical for small and relatively inexpensive handheld devices. In other areas, consumer cameras have not been useful in bar code applications because bar codes are designed for specialized equipment. This prevents many useful applications for bar codes from being implemented.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

Various embodiments of the invention pertain to novel features in a device containing at least one camera that permit novel uses for the device. In some embodiments, digitized images taken with two or more camera lenses with fixed focal lengths may be combined in ways that permit novel uses for the device. In other embodiments, a device containing a camera may perform as a bar code reader, and may wirelessly transmit and/or visually present a bar code to other devices.

Dual Cameras for Zoom Emulation and Other Functions

Various embodiments of the invention provide two separate camera lenses with different fixed focal lengths and correspondingly different fixed fields of view. By taking a picture of the same scene with both lenses, one picture being a close-up version of a portion of the other, the two images may enable various kinds of subsequent processing. In some embodiments, the narrow field of view lens may cover a field of view equal to, or slightly larger than, the smallest region within the wide field of view that will produce acceptable digital resolution when enlarged to full size. In this manner, an accurate digital comparison may be made between the full image of one picture and the selected portion of the other picture.

In the simplest action, the two pictures may simply be presented to a human evaluator to subjectively determine which is the preferred picture. In another action, the two images may be processed and merged to emulate the effects of a zoom lens, with better resolution than could be obtained with a simple digital zoom (i.e., cropping the original picture, which reduces the number of original pixels, even if the result is then enlarged to have more final pixels). Other advantageous results may also be available, such as using the separation between the two lenses to produce stereoscopic visual information, and such as comparing the two images to enable motion detection/stabilization.

These capabilities may be enabled in two separate embodiments. In one embodiment, each lens may have its own separate image sensor, effectively providing two separate cameras which may take their respective pictures at the same time if desired. In the other embodiment, the same image sensor may be used for both lenses, requiring that the two pictures be taken at different times. An optical selection system may be used to select which image reaches the sensor at a given time. This can be handled in various ways, such as but not limited to: 1) using a movable reflective device to direct the optical path from each lens to the image sensor at different times, or 2) directing the optical path from both lenses to the image sensor at the same time, but using a light-blocking device (e.g., a shutter) to prevent the light from the non-selected lens from reaching the image sensor.

Information derived from the two pictures may be used in various ways, such as but not limited to:

1) One of the two pictures may be selected for use, based at least in part on objective criteria and/or the subjective criteria of the human making the selection.

2) The narrow field of view image from one lens and the wide field of view image from the other lens may be digitally processed and combined to create an intermediate field of view image. The fine detail available from the narrow field of view image may be used to enhance portions of the wide field of view image in ways that would be unavailable from a simple digital zoom function. Multiple different intermediate field of view images may be produced in this manner, effectively emulating the results that could be obtained from an optical zoom lens. In some embodiments, this processing may take place in the camera or the device containing the camera, and the resulting intermediate field of view image may be presented to the user on the camera device's display. In other embodiments, this processing may take place in a separate device after downloading the two images to that separate device.

3) Since the two lenses are separated by a known distance, they will each have a slightly different angle of view of the same object in the pictures, enabling stereoscopic information and effects to be produced. If the full image from the narrow field of view lens is compared to the corresponding portion of the image from the wide field of view lens, a direct stereoscopic effect may be produced from the two images, similar to what would be obtained if both lenses had the same field of view and their full images were compared.

4) If the two images are taken at separate times, any movement of the scene between one image and the other may be detected by comparing corresponding portions of both pictures. As before, a portion of one image may have to be enlarged to enable a direct comparison. If movement is detected, this information may be handled in various ways, such as but not limited to: 1) notifying the user so that the user may decide what action to take, 2) keeping one image but discarding the other, 3) discarding both images, 4) keeping both images but cancelling any further processing, since the results may not be accurate, 5) using the difference between the images and different times the pictures were taken to calculate the amount or speed of the movement.

Figure 1:
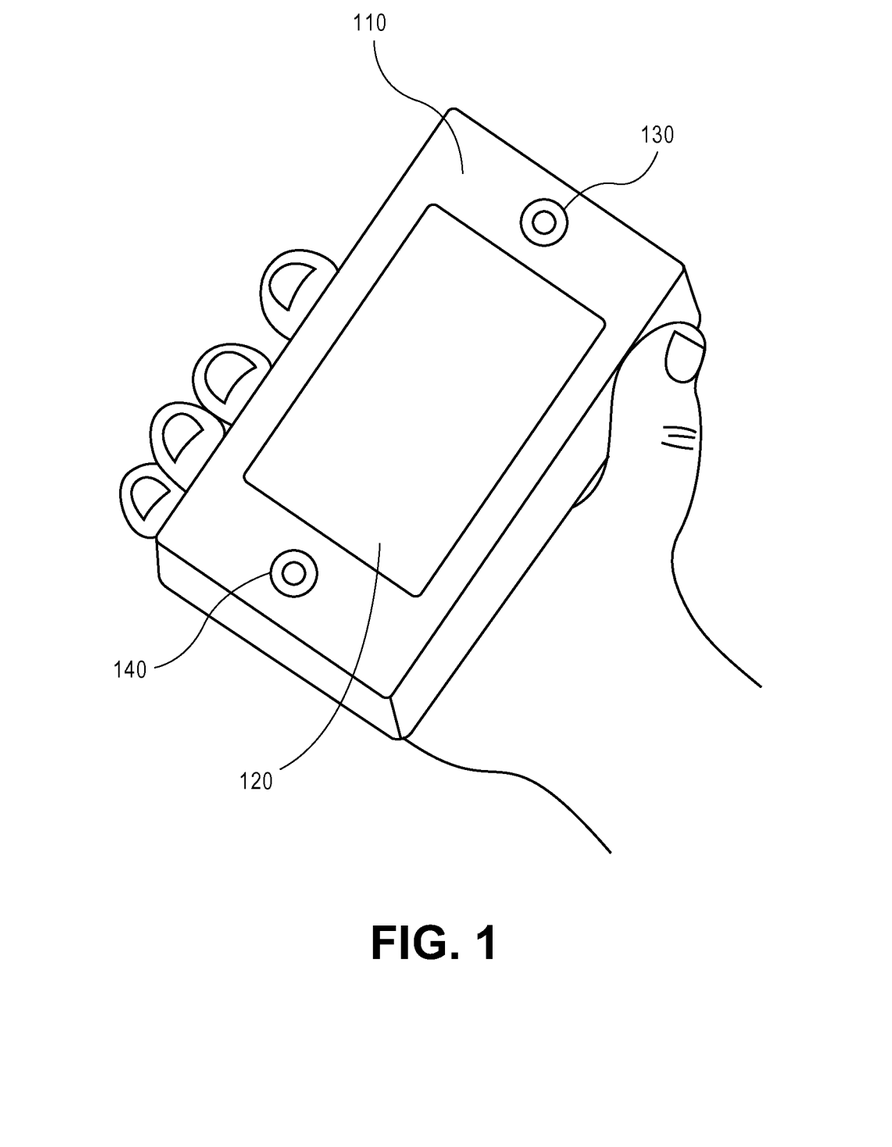
FIG. 1 shows a multi-function handheld user device with multiple built-in camera lenses, according to an embodiment of the invention.

FIG. 1 shows a multi-function handheld user device with multiple built-in camera lenses, according to an embodiment of the invention. Device 110 is shown with a display 120, a first camera lens 130 and a second camera lens 140. The remaining portions of the camera(s), as well as a processor, memory, radio, and other hardware and software components, may be contained within the device and are not visible in this figure. Although the illustrated device 110 is depicted as having a particular shape, proportion, and appearance, with the camera lenses located in particular locations on one of the two large surfaces, this is for example only and the embodiments of the invention may not be limited to this particular physical configuration. For example, in some embodiments the lenses may be located closer together, which could reduce parallax effects between the two images. In some embodiments the lenses may be located on a smaller surface (i.e., along an edge) of the device, which would allow for longer straight-line optical paths. In some embodiments the lenses 130, 140 may be on the opposite side of the device from the display 120, so that the display can act as a camera viewfinder for the user. In some embodiments the overall shape of the device 110 may be completely different than shown. In some embodiments, device 110 may be primarily a camera device, without much additional functionality. In other embodiments, device 110 may be a multi-function device, with many other functions unrelated to the camera.

FIGS. 2A-2D show different optical paths that may be used to direct light from the two lenses to the optical sensors(s), according to various embodiments of the invention. Note: the term 'lens', as used in this document, may include one or more pieces of optically refractive material arranged in a defined position to each other so that light traveling through all the pieces will be focused at a particular plane. The illustrated lens 210 shows three such pieces in cross section, with a double convex piece attached to a double concave piece, with a another double convex piece physically separated from both of them. Lens 220 shows two double convex pieces physically separated. Although any one of these pieces, in isolation, could be considered a lens, a collection of one or more such pieces in a defined physical position to each other, able to pass the same beam of light and focus it at a defined plane, shall be referred to as a 'lens' in this document. The particular quantity, positions, and shapes of these pieces shown in the drawings are for example only, and should not be interpreted as a limitation on the various embodiments of the invention. Other optical components not shown in the drawings, including lenses, may also be included. The term 'optical component', as used in this document, includes any physical object that changes the direction of light, through refraction and/or reflection, with the purpose of focusing an optical image at a particular location.

Figure 2A:
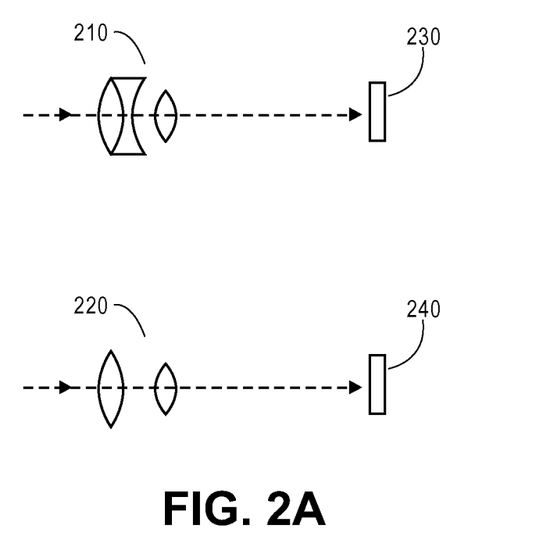
FIGS. 2A-2D show different optical paths that may be used to direct light from the lenses to the optical sensors(s), according to various embodiments of the invention.

FIG. 2A shows a separate optical sensor for each lens. Light traveling through lens 210 may produce a focused image on the first optical sensor 230, while light traveling through lens 220 may produce a focused image on the second optical sensor 240. In some embodiments, an optical sensor may comprise a rectangular array of individual light sensors, which collectively can sense a two-dimensional image that is focused on the array by a lens. Electrical signals from the optical sensor may be stored as digital values representing the image captured by the light sensors.

Figure 2B:
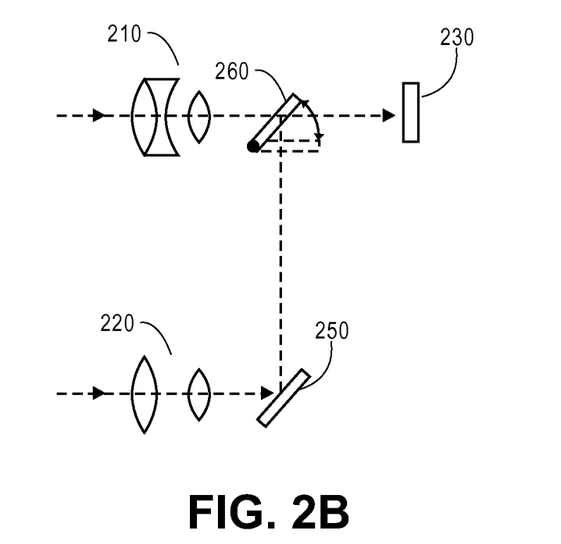

FIG. 2B shows a single optical sensor 230 for both of lenses 210 and 220, with a reflective surface (e.g., a mirror or prism) 260 being used to select which image will reach the optical sensor. When reflective surface 260 is in the position shown, the light from lens 220 reflects off another reflective surface 250 and then off reflective surface 260 to reach optical sensor 230, while the light from lens 210 is blocked off and doesn't reach optical sensor 230. When reflective surface 260 is in the alternate position, the light from lens 210 reaches optical sensor 230 unimpeded, while the light from lens 220 and reflective surface 250 is reflected in a different direction than optical sensor 230.

Figure 2C:
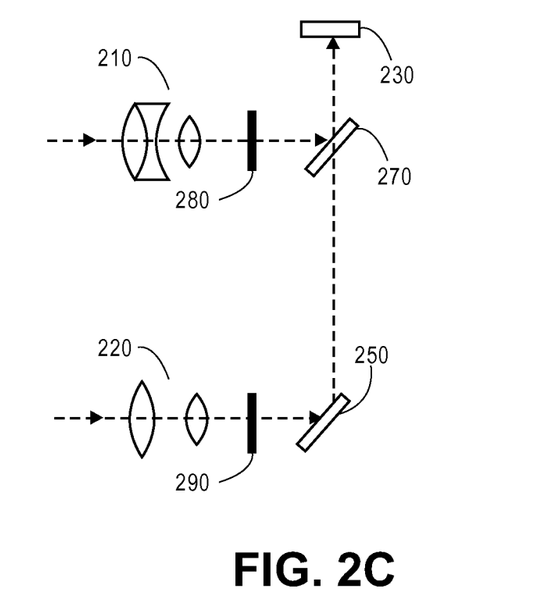

FIG. 2C shows a single optical sensor 230 for both lenses, similar to that shown in FIG. 2B, but without the need for a movable reflective device. In this embodiment, object 270 may be a beam-combiner that reflects the light from lens 210 to optical sensor 230, and can also pass the light from lens 220 and reflective surface 250 so that it also reaches optical sensor 230. However, to prevent the light from both lenses from simultaneously being detected by optical sensor 230, each lens may have an associated light-blocking device 280, 290 (e.g., a shutter) to block off the image from one lens while the image from the other lens is being sensed. By redirecting the light from each lens with a reflector or a beam combiner so that much of the optical path is perpendicular to the thin 'depth' dimension of the camera, and by placing the optical sensor 230 at an angle to receive this redirected light, a relatively long optical path may be accommodated in a very thin camera. Note that the drawings are not shown in proportion—the portion of the optical path that travels through the lens to the reflective surface (or beam combiner) may be shorter than the portion of the optical path that travels from the reflective surface (or beam combiner) to the optical sensor; This technique of making an 'L' shaped optical path may be used with any feasible lens and sensor configuration, including all of the ones shown in this document, to permit a long optical path in a thin camera. When that technique is combined with using a fixed focal-length lens rather than a zoom lens, an extremely thin camera is possible, whether that camera is using two lenses or just a single lens.

Figure 2D:
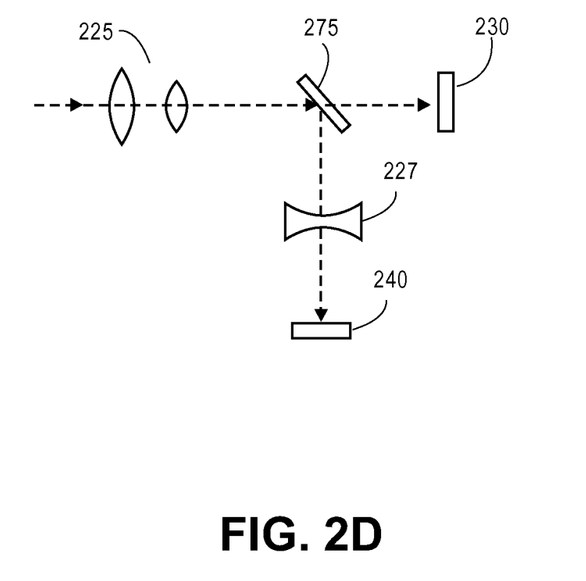

FIG. 2D shows a single front lens with two sensors and additional optics. In this embodiment, a beam-splitter 275 splits the light from lens 225. Part of the light travels to optical sensor 230, while part of the light travels through internal optical component 227 before reaching optical sensor 240. The internal lens changes the focal length so that the image reaching optical sensor 240 has a different field of view than the image reaching optical sensor 230. This technique essentially provides two lenses, similar to lenses 210, 220 of FIG. 2A (providing a wide field of view at one sensor and a narrow field of view at the other sensor), but the two lenses share the optical pieces at 225, and both images will be coaxial (i.e., the center of both images will be at the same spot in the picture). For some uses, the coaxial feature may eliminate the need to digitally shift one of the recorded images to compensate for parallax.

In any embodiment, an optical path may be reflected one or more times (such as the right-angle reflection shown in FIG. 2B) so that a long optical path may be accommodated within the narrow dimensions of the device 110. In some embodiments, a reflective surface may have a convex or concave shape so that it effectively acts as a lens as well as a reflector. Although most of the descriptions in this document refer to two lenses, additional lenses may also be used. For example, a third lens at the surface of the camera, possibly located near a third edge of the device, could extend the effective zoom range by providing an image with an even narrower field of view (greater magnification). By being located off the center-to-center axis of the other two lenses, it may also permit more robust stereo distance/displacement calculations.

Figure 3:
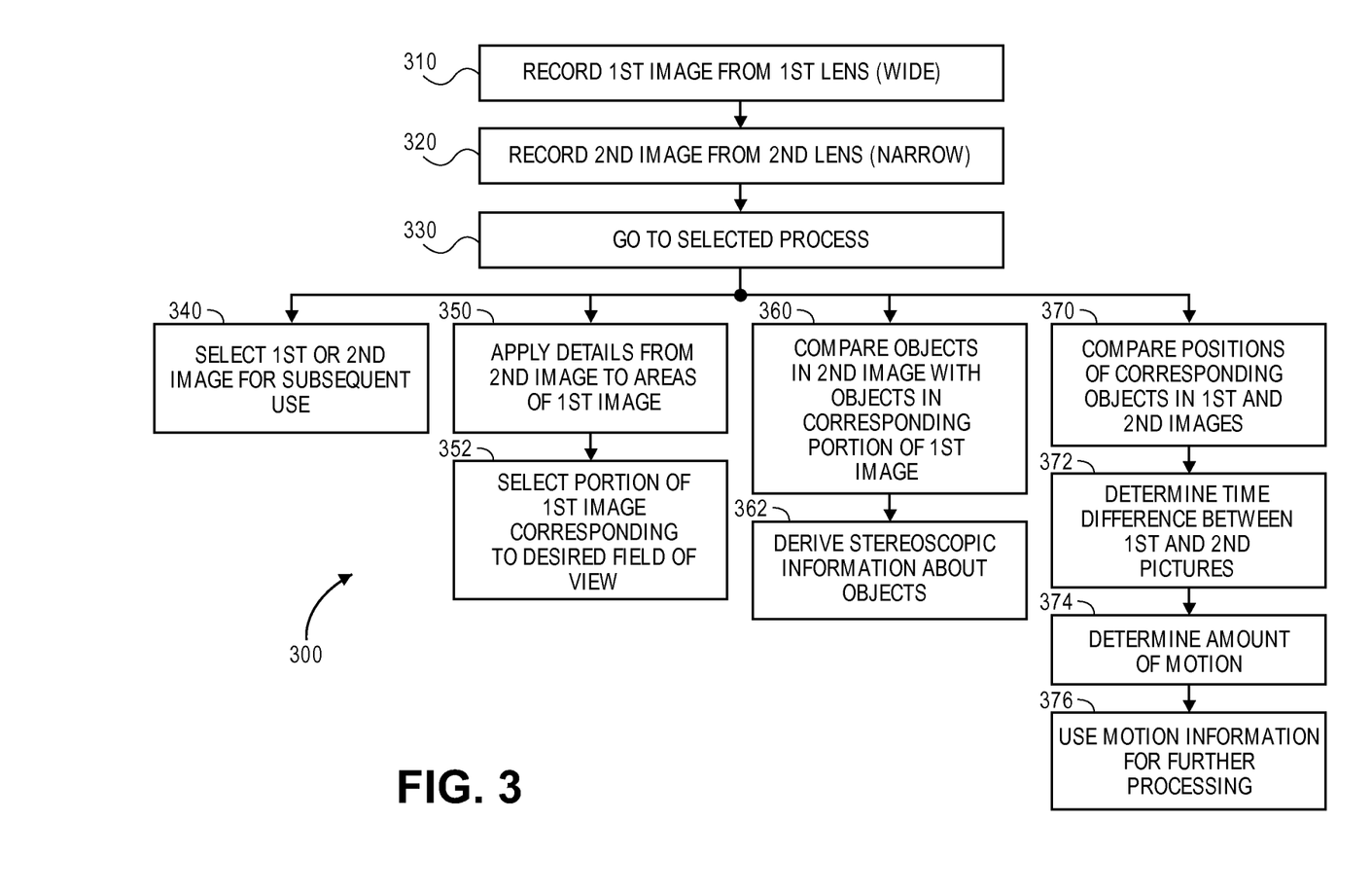
FIG. 3 shows a flow diagram of a method of operating a camera with two lenses, according to an embodiment of the invention.

FIG. 3 shows a flow diagram of a method of operating a camera with two lenses, according to an embodiment of the invention. In the illustrated flow diagram 300, at 310 a first picture may be taken using the first lens, which in this example is the lens with the wider field of view, and the resulting first image is recorded by being stored in a digital format. At 320 a second picture may be taken using the second lens (having the narrower field of view), and the resulting second image is stored. As previously indicated, the pictures may generally be taken at slightly different times (in the order indicated or the reverse of that order), but in embodiments having two cameras may be taken at the same time. As indicated at 330, the recorded images may be processed in various ways, described in the subsequent portions of FIG. 3. One, none, or multiple ones of these four processes may be used on the two recorded images.

In the first process, one of the two stored images may be selected at 340 for further use. For example, a person may determine the first image of a landscape is more aesthetically pleasing than the second image of a small portion of that landscape, and may further edit the first image to produce an artistic photo of the landscape. In another example, a person may determine that the second image, showing a close up of a flower, is preferable to the first image showing the entire garden, and select the second image for further processing. In some examples, both images may be deemed suitable for retention and subsequent use.

In the second process, the effects of a zoom lens may be emulated. Although a simple digital zoom may be created with the first image alone by simply selecting a portion of the first image and enlarging it to full size, the digitally enlarged first image may not have sufficient resolution because the original pixel count prevents any improvement in resolution. However, since the second image provides a more detailed description of a portion of the first image, at 350 the more detailed textures of the second image may be applied to the corresponding parts of the digitally enlarged portion of the first image. In addition, if portions of the first image fall outside the view of the second image but are determined to have similar textures (e.g., the grass in a field, the bricks on a building, etc.), these more detailed textures may also be applied to those areas. This texture mapping may be performed either automatically or by the user. After applying the more detailed information from the second image to the first image, at 352 the modified first image may be cropped and enlarged to provide an intermediate field of view that is somewhere between the fields of view provided by the original first and second images.

Although the actions of 350 and 352 are described in a particular order, they may be performed in the reverse order, or performed incrementally by switching back and forth between 350 and 352. For example, the image from the wide field-of-view lens may be digitally zoomed (computationally magnified) until further digital zooming would result in unacceptably poor pixel resolution in the areas of interest (presumably near the center of the image). Then the narrow field of view image may be applied to the relevant portions of the wide field of view image to increase image detail in the latter. Then the resultant image may be digitally zoomed even further.

In the third process of FIG. 3, the separation distance between the first and second lenses may be used to derive stereoscopic information. This separation distance provides a slightly different angle of view of the same object between the first and second images. Since the original fields of view are also different, the process may begin at 360 by comparing the second image only with the corresponding part of the first image, and at 362 deriving stereoscopic information about one or more objects depicted in the images based on the slightly different angle of view. One technique is to determine the position of an object in the second image and determine the position of the same object in the comparably enlarged portion of the first image. The displacement of the object between images, along with a knowledge of the separation distance between the two lenses, may be used to determine the distance of the object from the camera. The distances of multiple objects from the camera may be determined in this manner, and used to construct a layered mapping of the objects. For example, a narrower depth of field may be simulated by blurring objects that are outside a predetermined range of distances from the camera. In another technique, the depth images may be combined with GPS information to develop a physical, 3D model of the surroundings. In another example, the two images (the second image and the enlarged portion of the first image that corresponds to it) may be placed into a stereoscopic viewer, thus providing a stereoscopic viewing experience without having to derive further data on the objects in the images.

In the fourth process, to be used only when the two pictures are taken at different times, the two images may be used to derive motion information. This information may be used to detect motion of the camera (e.g., camera shake), or may be used to calculate the motion of an object in the images. After adjusting the fields of view so that both images represent the same field of view, at 370 the positions of one or more corresponding objects in the two images may be compared to see if they are located at the same position in both images. If not, the difference in position between the two images is compared at 372, and the amount of motion implied by that difference may be calculated at 374. This information may be used in various ways at 376.

If the entire image appears to have shifted, and in the same direction, it may be assumed that this movement was caused by motion of the camera between pictures (e.g., deliberate panning or unintentional camera shake). This determination may be handled in various ways, such as but not limited to: 1) the user may be alerted that the camera moved, so the user may determine what actions to take, 2) further processing of the images may be cancelled, and/or the images discarded, 3) one image may be digitally shifted back until it is equivalent to a picture taken from a motionless camera. On the other hand, if an object appears to have shifted between the times the two pictures were taken, but significant portions of the two images appear to be unshifted, it may be assumed that the object moved. The amount of shift may be converted into various motion information about the object, such as lateral movement. The direction of movement may easily be determined. If the distance to the object can be determined, the amount of movement may be calculated, and that in turn may be converted into the average velocity of that movement, based on the time between taking the two pictures. Other types of useful information may also be determined based on an apparent shift of all or a portion of the images.

Other processing techniques may also be used, depending on the application. For example:

Coaxial Image Alignment—Because of the separation distance between the two lenses, the two images being captured may not be coaxial—i.e., the part of the scene that appears at the center of one image may be offset from the center of the other image. This relative image shift varies with the distance to the subject, and may need to be corrected for some applications, such as zoom emulation. Manufacturing tolerances may also cause some lateral and/or rotational displacement between the two images. Such corrections can be made during the processing of the images.

Photometric Matching—Due to manufacturing variations in the image sensors and optics, correction and normalization for luminance and/or chrominance may be required.

Anti-Aliasing—Anti-aliasing of the individual images—in particular in the overlap regions between the two images—may be necessary due to the discrete pixel structures in the two images.

Motion Blur Reduction—This may be useful for video as a post-production technique, among other uses. A highly blurred frame (due to motion during the interval in which the image is being sensed) may be replaced with a motion-interpolated, repositioned cloned frame from before or after the blurred frame. Motion in the image from one lens may similarly be corrected if the image from the other lens, taken at a different time, is not blurred. Other sensor data (such as accelerometer data to indicate the camera was moving) may be used to identify potentially blurred frames.

Noise Reduction—A variety of integration and signal processing techniques may be employed to reduce the visual 'noise' from images captured at low light levels.

Mosaic construction—Multiple pictures may be taken with the narrow field of view lens, pictures which collectively cover the area depicted in the picture from the wide field of view lens. Using the wide image for contextual reference, the narrow images may then be digitally stitched together to create a digital image covering most or all of the wide field of view picture, but having the fine detail of the narrow field of view images.

User memory aid—The wide picture may be used to provide overall context for the related narrow picture, so that the user can remember various information about the narrow picture, such as where the picture was taken and what the circumstances were. The saved images may be helpful to the user in other ways as well.

Many of the various techniques discussed herein may be used in three different modes—viewfinder, shoot, and post-processing. In the viewfinder mode, the main objective is to present an image (e.g., an intermediate zoomed image) to the camera's display quickly, so that the user can compose the frame for still or video capture. The quality of the displayed picture only needs to be good enough for visual composition on that display. This permits down sampling of the output from the image sensors, which can greatly reduce the computational load. In some embodiments, only the image from one lens may be used in viewfinder mode, although that image may be digitally zoomed. Various operations may be performed in the viewfinder mode, such as but not limited to: 1) check the zoom setting, 2) select the best image (narrow or wide field of view) for that zoom setting, 3) capture the image at an appropriate resolution, 4) digitally zoom the image to the desired zoom setting, and 5) show the zoomed image on the device's display.

In the shoot mode, the complete output from the captured images, along with suitable metadata, may be stored and processed to produce a high-quality result. These operations may include, but are not limited to: 1) capture both images and store at full resolution, 2) store metadata associated with the images (such as time, GPS reading, desired zoom setting at time picture was taken, etc., 3) process images to produce a review image for the viewfinder (will typically have better image quality than the image displayed in the viewfinder mode but less quality than is possible with post processing).

In the post-processing mode, various image enhancement techniques may be used to improve the quality of the final pictures produced from the stored images. Such post-processing may be performed in the camera device, or may be performed in an external device that has more processing power.

Post-processing may be performed on the original recorded images from the two lenses, and/or may be performed on an intermediate result of those two recorded images. These operations may include, but are not limited to: 1) allow user to vary zoom setting (may be different than the zoom setting selected at shoot time), and produce high-quality image at the new zoom setting, 2) perform various other image processing such as image registration, anti-aliasing, color balancing across images, global texture enhancement, stereo and motion processing, etc., 3) provide review display appropriate for the available display screen, 4) save this high-quality image, 5) archive original data to allow future reprocessing. Post processing may be performed in the camera device, in a separate processing device, or in a combination of both.

Camera-Based Bar Code Reader and Display

Various embodiments of the invention relate to a handheld user device that takes a standard digitized picture of a bar code and analyzes the image to determine the numbers encoded into the bar code. In addition, the device may present a bar code on its display screen, which can be used for various purposes. In some embodiments, a specialized camera lens may be used on the camera to allow a picture to be taken of close up objects (such as a printed bar code), even though the lens is normally focused for more distant objects. Within the context of this document, the term 'focus distance' is used to describe the distance between the front of the camera lens and the object being photographed when the image of the object is in focus, i.e., when that image is focused at the plane of the optical sensor.

Figure 4:
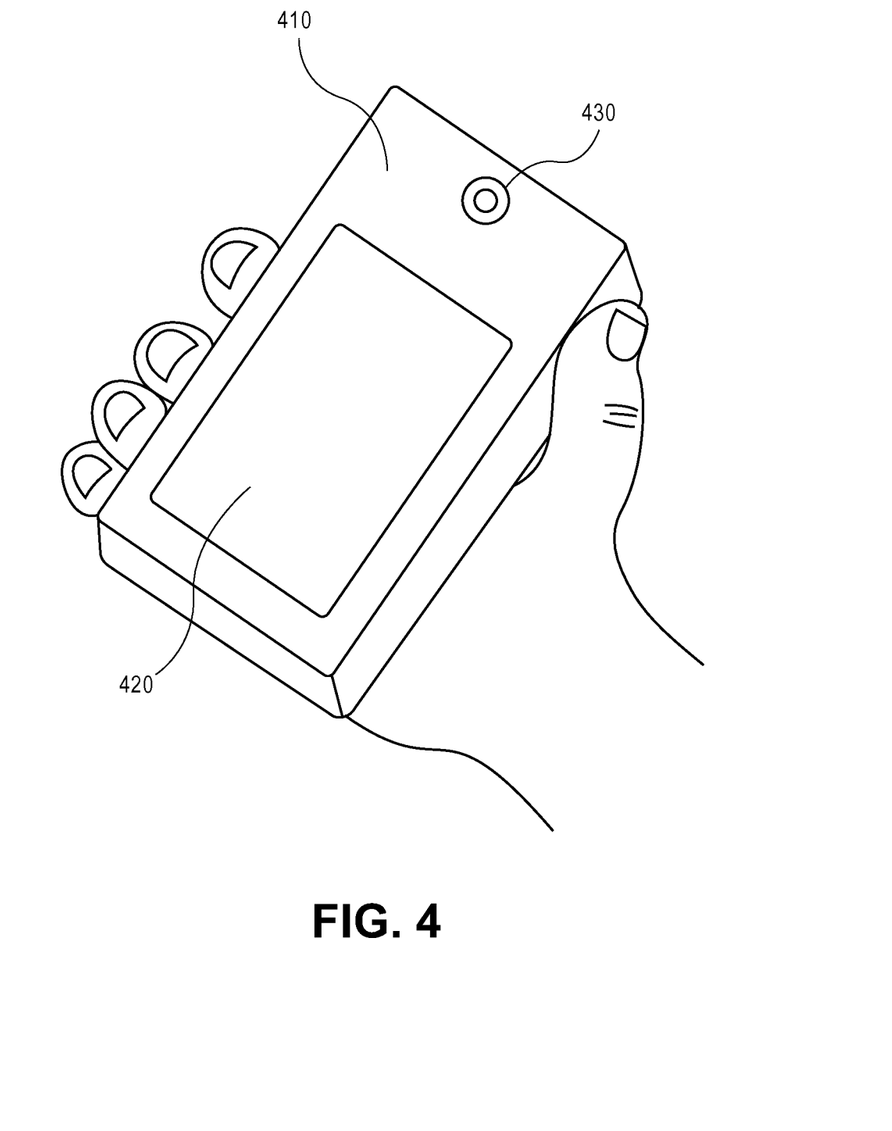
FIG. 4 shows a multi-function handheld user device with a built-in camera, according to an embodiment of the invention.

FIG. 4 shows a multi-function handheld user device with a built-in camera, according to an embodiment of the invention. Device 410 is shown with a display 420 and a camera lens 430. The rest of the camera, as well as a processor, memory, radio, and other hardware and software functionality, may be contained within the device and is not visible in this figure. Although the illustrated device 410 is depicted as having a particular shape, proportion, and appearance, this is for example only and the embodiments of the invention may not be limited to this particular physical configuration. In some embodiments, device 410 may be primarily a camera and display device, without much additional functionality. In other embodiments, device 410 may have many other functions unrelated to the camera. For ease of illustration, the display 420 and camera lens 430 are shown on the same side of the device, but in many embodiments the lens will be on the opposite side of the device from the display, or alternately on an edge side of the device, so that the display can operate as a viewfinder for the user. In some embodiments, there may be different lenses at different locations on the device, with each lens capable of working with an optical sensor to take pictures.

Figure 5:
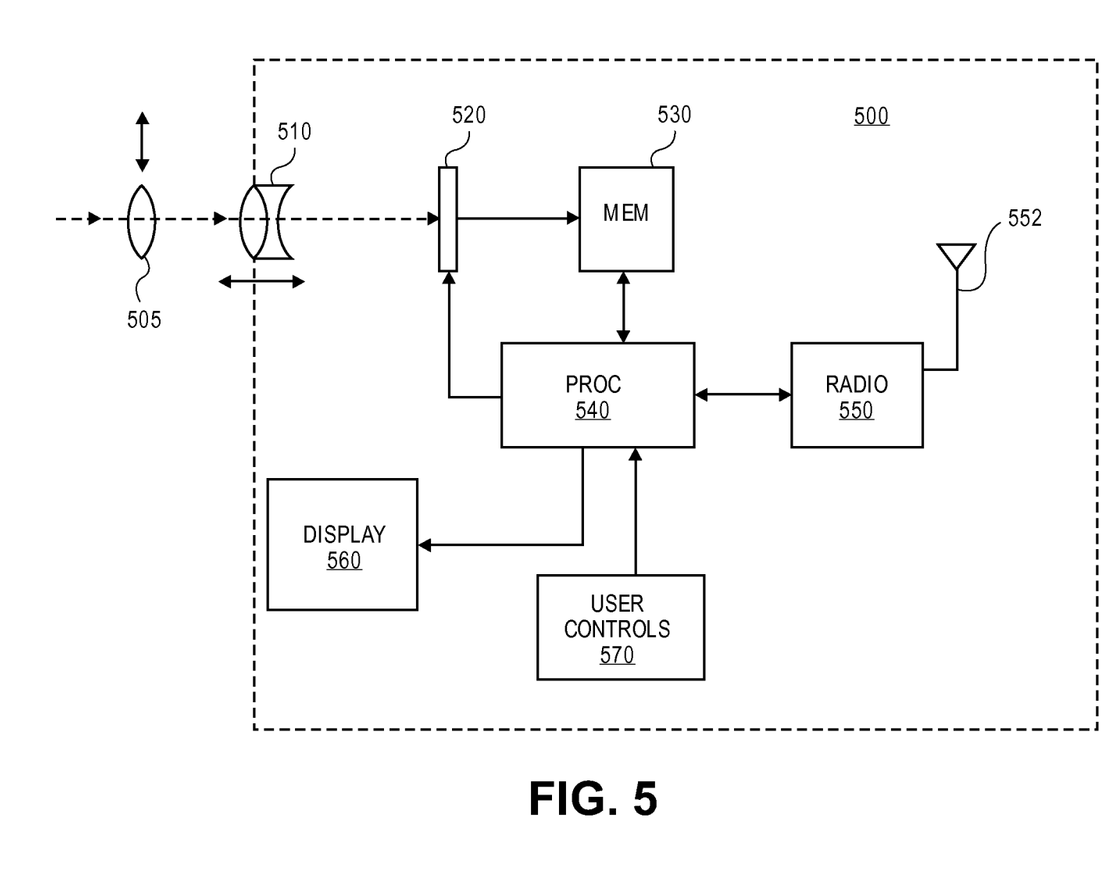
FIG. 5 shows a camera system, according to an embodiment of the invention.

FIG. 5 shows a camera system, according to an embodiment of the invention. In the illustrated embodiment of camera system 500, a primary lens 510 may focus an optical image on an optical sensor 520. Primary lens 510 may comprise one or more pieces of optically refractive material that collectively focus an image of a distant object onto the receptors of the optical sensor 520. The primary lens may be chosen so that the range of distances to the object that will cause the image to be properly focused at the sensor are suitable for the camera's typical intended use (for example, from 6 feet to infinity, although this is just an example). The optical sensor itself may comprise a rectangular array of light sensors, where each light sensor senses the light that will make up no more than one pixel in the sensed image. In some embodiments, multiple light sensors, each sensing a different spectral color, will be clustered together to collectively produce one colored pixel in the sensed image.

The image sensed by optical sensor 520 may be stored in memory 530 as a digitized image. In some embodiments memory 530 is dedicated to storing images, but in other embodiments memory 530 may simply be a portion of a larger memory that is also used for other purposes. In still other embodiments, the optical sensor may serve as the storage element until the received image has been sufficiently processed, eliminating the need to store the received image in memory 530. One or more processors 540 may be used to provide overall control of the various components of the camera system 500, and to receive inputs from at least some of those components. A display 560 may be used for various purposes, such as operating as a viewfinder to display the image that is being sensed, or to display an image that has already been stored. A radio 550 may be used to communicate wirelessly with other devices through antenna(s) 552. One purpose may be to transmit the image, or information derived from the image, to one or more other devices that can use that information to derive more useful information. Various user controls 570 may also be incorporated, allowing the user to control which functions are being performed by the camera system 500. For example, the user may determine when to take a picture, what is to be shown on display 560, what information to transmit to another device, etc.

In some embodiments, a movable auxiliary lens 505 may be included, allowing the camera to focus on an object that is very close to the camera (for example, less than 10 inches, but this is only an example). The auxiliary lens may be moved in and out of its close-focus position in various ways. For example, it might slide in a direction perpendicular to the optical axis of lens 510 (as indicated in the drawing), so that it is in the optical path of lens 510 (i.e., light passing through the lens 510 also passes through the auxiliary lens 505) when close-up photography is desired, and is out of that optical path at other times. In another embodiment, auxiliary lens 505 may move in a direction parallel to the optical axis so that the image always passes through both lenses 505 and 510, but the different positions will properly focus objects that are at different distances from the camera. Such an auxiliary lens is shown in front of lens 510, but in other embodiments might be behind lens 510. Rather than enabling a continuous micro-to-macro range of focus distances, which typically requires a much larger and more complicated lens assembly, the auxiliary lens may have only two operational positions, with one position allowing the camera to take close-up pictures, and the other position allowing the camera to take pictures of more distant objects. Various techniques may limit the auxiliary lens to being physically stable and stationary in only those two positions, with any intermediate position being physically unstable (i.e., the lens will attempt to move to one of the stable positions) and considered non-operational. For example, mechanical stops may limit the auxiliary lens to those two positions, with a spring-loaded force preventing the auxiliary lens from being stable at any intermediate position, though this is only one example. Further, the optical characteristics of the lens system may be such that no image will be in focus at the optical sensor when the auxiliary lens is not in either the first or second position. In some embodiments the user may manually select which of the two positions the auxiliary lens will be in.

In another embodiment, rather than modifying the focus distance of lens 510, auxiliary lens 505 may stand alone as a completely separate lens for taking close-up pictures, without any interaction with lens 510. In some cases, this close-up lens may have its own optical sensor, essentially providing a separate camera for close-up photography. In still another embodiment, auxiliary lens 505 may be omitted, and lens 510 may be simply moved (as shown by the arrow) to a different distance from optical sensor 520 so that it will focus properly on objects that are close to the camera. As before, the close-focus and normal-focus positions may be defined by mechanical stops or other physical constraints that make lens 510 physically stable in either of those two positions but physically unstable in intermediate positions.

Figure 6:
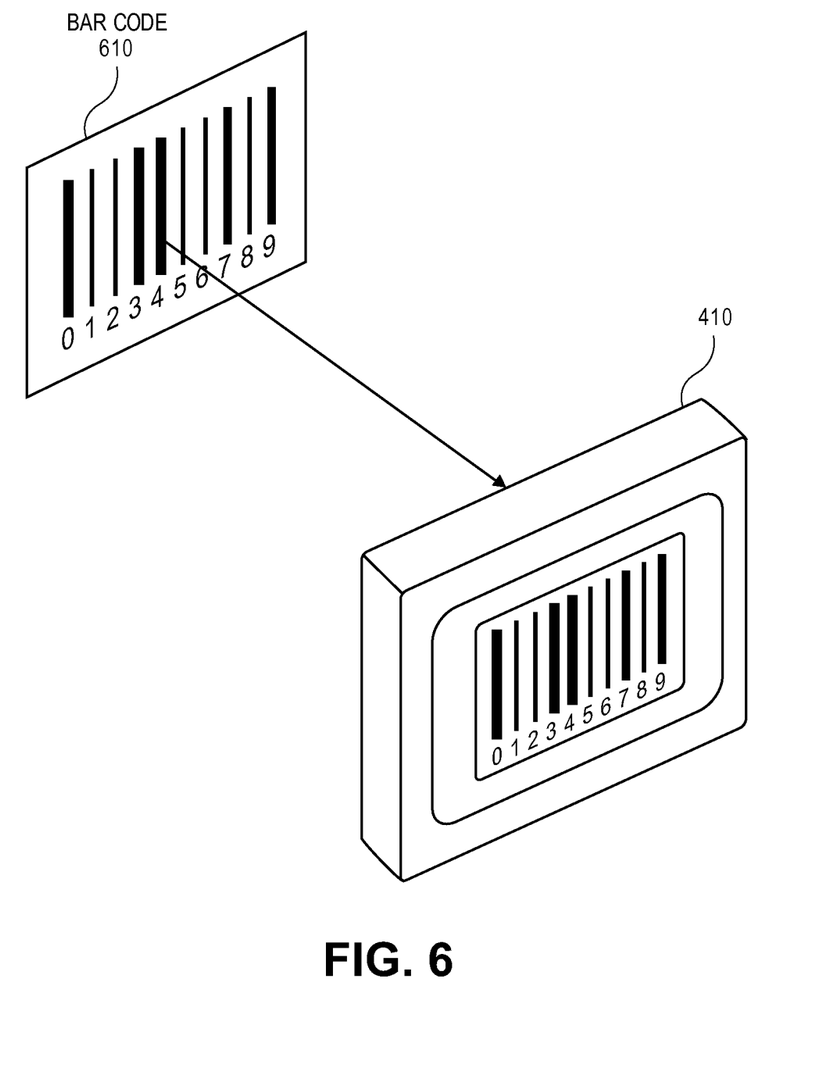
FIG. 6 shows a camera reading a bar code, according to an embodiment of the invention.
Figure 7:
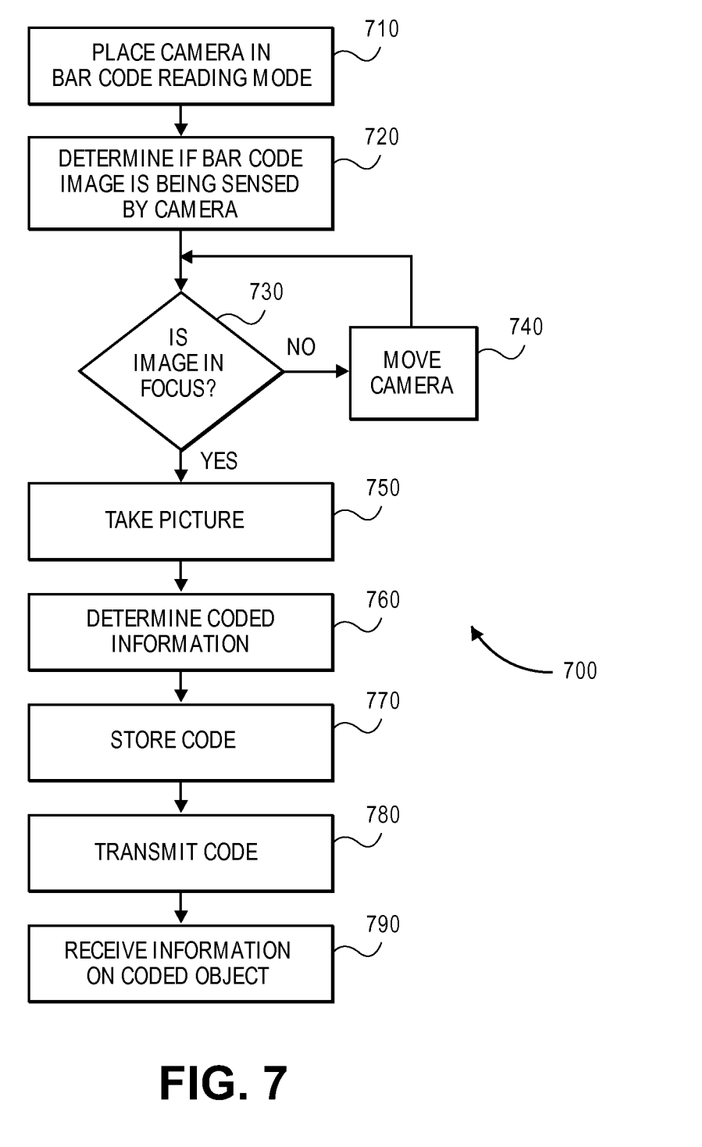
FIG. 7 shows a flow diagram of a method of using a camera to read a bar code, according to an embodiment of the invention.

FIG. 6 shows a camera reading a bar code, according to an embodiment of the invention. A striped-format bar code is shown, but other types of bar code may also be used. FIG. 7 shows a flow diagram of a method of using a camera to read a bar code, according to an embodiment of the invention. The following description applies to both FIG. 6 and the flow diagram 700 in FIG. 7.

Device 410 (which may comprise the components of camera system 500) may first be placed at step 710 into the proper mode for taking a picture of a bar code. Going into this mode may have various effects on the device, such as but not limited to: 1) placing the auxiliary lens into its operating position for a close-up picture, or activating the separate camera that is used for close-up pictures, 2) activating the software that decodes the bar code information, and 3) activating the functionality that aids in focusing on the bar code image. At 720, the user may place the camera in front of the bar code label 610 until it is determined that the bar code label is being sensed by the optical sensor. In some embodiments, the user may make this determination based on the image in the viewfinder. In other embodiments, the presence of the full label in the image may be automatically detected.

At 730, 740, the camera may be focused on the bar code label. In some embodiments this may involve an auto-focus function in the camera. In other embodiments the user may change the camera's distance from the label until the image is in focus, as indicated at 740. If necessary, operations 720, 730, and 740 may be performed interactively and concurrently. Because the nature of close-up photography may cause the camera to have a fairly narrow depth of field, it may be important for the user to accurately place the camera the correct distance from the bar code. This may be accomplished in several different ways, such as but not limited to:

1) If the camera's display is used as a viewfinder, the user can move the camera back and forth until the image displayed in the viewfinder appears to be in focus. An out-of-focus image in the display implies an out-of-focus image at the optical sensor.

2) A simple visible image can be projected from the front of the camera onto the surface containing the bar code label. When the bar code is at the right distance, the visible image may so indicate. For example, in one embodiment two narrow beams of visible light may be projected at converging angles. When the reflected spots converge into a single spot at the center of the label, the camera is at the right distance and the image is centered. Alternately, two more complex images may be projected onto the bar code label, and the camera is at the right distance then they completely overlap. In another embodiment, a projected image will be in focus on the label surface only when the camera is the correct distance from the label. In some embodiments, a holographic optical element may be used to determine the proper camera distance.

3) Sound pulses (either audible or ultrasound) may be generated from the front of the camera. By measuring how long it takes the reflected sound waves to be received by the camera, the distance to the bar code label can be determined.

Regardless of the focusing technique used, when the bar code image is in focus, in some embodiments an indication can be presented to the user that the distance is correct (e.g., an audible beep, a lighted LED, a visual indication on the display, etc.)

Once the camera is at the correct distance, and the bar code is within the camera's field of view, the user may take the picture at 750 and store that image in memory for further processing. If necessary, the bar code may be illuminated by light from the camera for this picture. This illumination may come from the built-in flash unit, or from another light source on the camera. In some instances, this source of illumination may also be used when determining the correct focus distance for the camera.

In some embodiments, the camera may record the image of a bar code being displayed on a video screen rather than a printed bar code. This may present different illumination considerations, since the display is self-illuminated and therefore may not require further illumination from the camera. Also, the smoothly reflective screen of the display may change the focusing mechanisms that are feasible.

After the picture is taken and stored, the stored image may then be analyzed at 760 to decode the bar code's value (e.g., the sequence of numbers encoded into the bar code), and this value stored in memory at 770. The complexity of decoding the bar code may depend on the type of bar code being used. For example, with a simple striped-format bar code, it may be as simple as examining a single raster scan line to measure the width in pixels of each bar code line and measure the distance in pixels between adjacent bar code lines. These relative values may then be converted into the encoded sequence of numbers. If the bar code provides a calibration field to compensate for different perceived sizes of the bar code, the apparent distance compression caused by a rotated image may not need to be compensated for, and the user may not have to worry about the relative orientation between the camera and bar code label when the picture is taken. But if orientation is important, the focusing aid may include a visual indication of whether the camera is properly oriented with the bar code before the picture is taken.

Other embodiments may use other, more complicated techniques. For example, since some bar codes also have their encoded sequence printed in numerical symbols that are readable by a human, the analysis may focus on decoding those symbols rather than, or in addition to, the bar code symbology.

Once a bar code has been read and decoded, various operations may be performed. In one operation, the stored code may be simply retained (possibly with other stored codes) until a future time and circumstance requires that information. In another operation, further information may be sought on the object identified by its bar code. For example, the camera device may transmit the decoded bar code information to another device at 780, which can obtain information such as but not limited to: 1) a description of the object associated with the bar code, 2) the price of the object, 3) how many of the objects are available, 4) where other such objects are located, 4) manufacturing information, 5) size and/or weight of the object, 6) expiration date of the object, 7) etc. In some operations this information may be transmitted back to the camera device at 790 for storage and/or presentation to the user.

Figure 8:
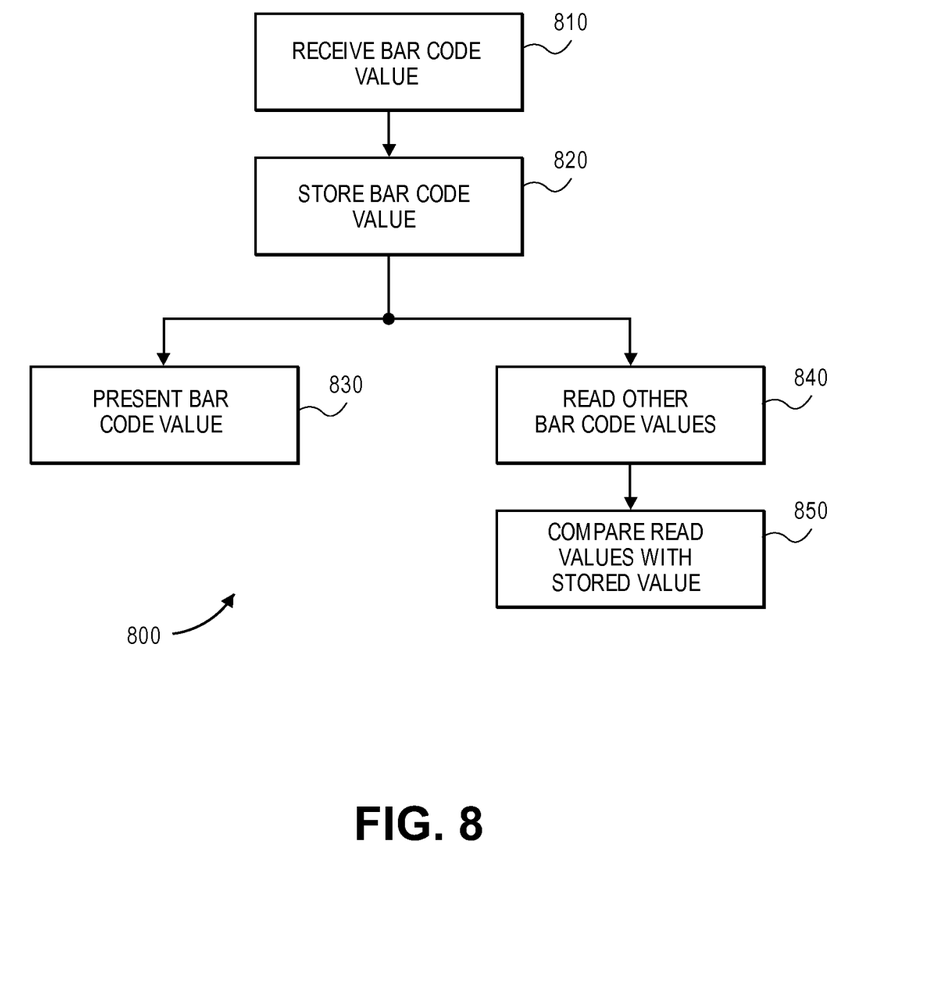
FIG. 8 shows a flow diagram of a method of using bar code values, according to an embodiment of the invention.

Other uses may be found for bar codes that can be implemented with the help of the device 410 described in this document. FIG. 8 shows a flow diagram of a method of using bar code values, according to an embodiment of the invention. For example, in flow diagram 800 various bar code values may be entered into device 410 at 810, and stored at 820 for presentation or comparison at another time. In various embodiments, these may be received through a wireless communication, may be manually entered through a keyboard or other manual entry device, may be entered by taking a picture of the barcode, or may be received through a temporary signal cable connected to the device.

At 830, a bar code received in this way may be presented at a later time for various uses, such as but not limited to: 1) a bar code may represent a coupon that can be used for a purchase discount, 2) the bar code may represent an admission ticket for a public event, 3) the bar code may represent an item that was purchased online, but is to be picked up at a local store by the purchaser, 4) etc. The bar code may be presented by the user in various ways, such as but not limited to: 1) the bar code may be wirelessly transmitted from the user's device to the vendor's device, which can verify the validity of the code through its own database, 2) a picture of the bar code may be displayed on the user's device, and the vendor's device (which might be similar to the user's device) can read and decode that picture of a bar code. The display might be the device's primary display, but in another embodiment a secondary display might be used for this purpose. Regardless of how the bar code data is communicated, the vendor device can verify the validity of the code through its own database.

The user may also use the device to read other bar codes at 840, and compare them with the stored bar code at 850. For example, the vendors described in the previous paragraph may operate in this manner. A user may store the bar code for an item he/she is looking for, and read the bar code off a box on the shelf to verify it contains the sought-after purchase. Various other real-world applications may be found for using bar codes in the ways described in this document, without requiring the user to purchase specialized commercial bar code equipment.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus for recording first and second visual images, comprising a handheld electronic device having a camera system, the camera system comprising:
  a first lens with a fixed first field of view and a second lens with a fixed second field of view smaller than the first field of view;
  at least one optical sensor to sense a first visual image provided by the first lens and to sense a second visual image provided by the second lens; and
  an optical selection system to direct the first visual image to the optical sensor at a first time and to direct the second visual image to the optical sensor at a second time, the optical selection system comprising a component selected from a list consisting of:
    (1) a movable reflective surface that can occupy first and second different positions, the reflective surface to cause the first visual image but not the second visual image to reach the image sensor when in the first position and to cause the second visual image but not the first visual image to reach the image sensor when in the second position; and
    (2) a beam-combiner to direct both the first and second visual images to the image sensor without movement of the beam-combiner, and at least one light blocking device to prevent the first and second visual images from reaching the beam-combiner simultaneously;
  wherein the device is to record the first visual image and the second visual image.

2. The apparatus of claim 1, wherein:
  the camera system comprises at least one optical component to change a focal length of one of the first and second lenses.

3. The apparatus of claim 1, wherein the first and second lenses are physically separated by a particular distance.

4. A method of recording first and second visual images, comprising:
  receiving a first visual image provided by a first lens of a camera having a fixed first field of view, wherein receiving the first visual image comprises sensing the first visual image with an optical sensor at a first time;
  receiving a second visual image provided by a second lens of the camera having a fixed second field of view smaller than the first field of view, wherein the second visual image is a subset of the first visual image, wherein receiving the second visual image comprises sensing the second visual image with the optical sensor at a second time different than the first time; and
  comparing the first and second stored visual images to determine motion occurring between the first and second times.

5. The method of claim 4, wherein said receiving the first visual image comprises sensing the first visual image with a first optical sensor and said receiving the second visual image comprises sensing the second visual image with a second optical sensor.

6. The method of claim 4, further comprising modifying the first stored visual image with texture information from the second stored visual image.

7. The method of claim 4, further comprising using the first and second stored visual images to determine a distance between the camera and an object depicted in both the first and second visual images.

8. An article comprising a computer-readable storage medium that contains instructions, which when executed by one or more processors result in performing operations comprising:
  receiving a first visual image provided by a first lens of a camera having a fixed first field of view, the operation of receiving the first visual image comprising sensing the first visual image at a first time; and
  receiving a second visual image provided by a second lens of the camera having a fixed second field of view smaller than the first field of view, wherein the second visual image is a subset of the first visual image, the operation of receiving the second visual image comprising sensing the second visual image at a second time different than the first time; and
  comparing the first and second stored visual images to determine motion occurring between the first and second times.

9. The article of claim 8, wherein the operation of receiving the first visual image comprises sensing the first visual image with a first optical sensor and the operation of receiving the second visual image comprises sensing the second visual image with a second optical sensor.

10. The article of claim 8, wherein the operations further comprise modifying the first stored visual image with texture information from the second stored visual image.

11. The article of claim 8, wherein the operations further comprise using the first and second stored visual images to determine a distance between the camera and an object depicted in both the first and second visual images.

12. A method of recording first and second visual images, comprising:
   receiving a first visual image provided by a first lens of a camera having a fixed first field of view;
   receiving a second visual image provided by a second lens of the camera having a fixed second field of view smaller than the first field of view, wherein the second visual image is a subset of the first visual image; and
   processing the first and second visual images together to produce a third visual image with an intermediate field of view between the first and second fields of view, and with a resolution for at least part of the third visual image that is better than the resolution of a corresponding part of the first visual image.

13. The method of claim 12, further comprising modifying the first stored visual image with texture information from the second stored visual image.

14. The method of claim 12, further comprising using the first and second stored visual images to determine a distance between the camera and an object depicted in both the first and second visual images.

15. A method of recording first and second visual images, comprising:
   receiving a first visual image provided by a first lens of a camera having a fixed first field of view;
   receiving a second visual image provided by a second lens of the camera having a fixed second field of view smaller than the first field of view, wherein the second visual image is a subset of the first visual image; and
   performing a displacement correction on at least one of the first and second visual images to produce a coaxial alignment between the first and second visual images.

16. The method of claim 15, further comprising modifying the first stored visual image with texture information from the second stored visual image.

17. The method of claim 15, further comprising using the first and second stored visual images to determine a distance between the camera and an object depicted in both the first and second visual images.

18. An article comprising a computer-readable storage medium that contains instructions, which when executed by one or more processors result in performing operations comprising:
   receiving a first visual image provided by a first lens of a camera having a fixed first field of view; and
   receiving a second visual image provided by a second lens of the camera having a fixed second field of view smaller than the first field of view, wherein the second visual image is a subset of the first visual image; and
   processing the first and second visual images together to produce a third image with an intermediate field of view between the first and second fields of view, and with a higher resolution for at least part of the third image than the resolution of a corresponding part of the first visual image.

19. The article of claim 18, wherein the operations further comprise modifying the first stored visual image with texture information from the second stored visual image.

20. The article of claim 18, wherein the operations further comprise using the first and second stored visual images to determine a distance between the camera and an object depicted in both the first and second visual images.

21. An article comprising a computer-readable storage medium that contains instructions, which when executed by one or more processors result in performing operations comprising:
   receiving a first visual image provided by a first lens of a camera having a fixed first field of view; and
   receiving a second visual image provided by a second lens of the camera having a fixed second field of view smaller than the first field of view, wherein the second visual image is a subset of the first visual image; and
   performing a displacement correction on at least one of the first and second visual images to produce a coaxial alignment between the first and second visual images.

22. The article of claim 21, wherein the operations further comprise modifying the first stored visual image with texture information from the second stored visual image.

23. The article of claim 21, wherein the operations further comprise using the first and second stored visual images to determine a distance between the camera and an object depicted in both the first and second visual images.

* * * * *